United States Patent Office 3,482,919
Patented Dec. 9, 1969

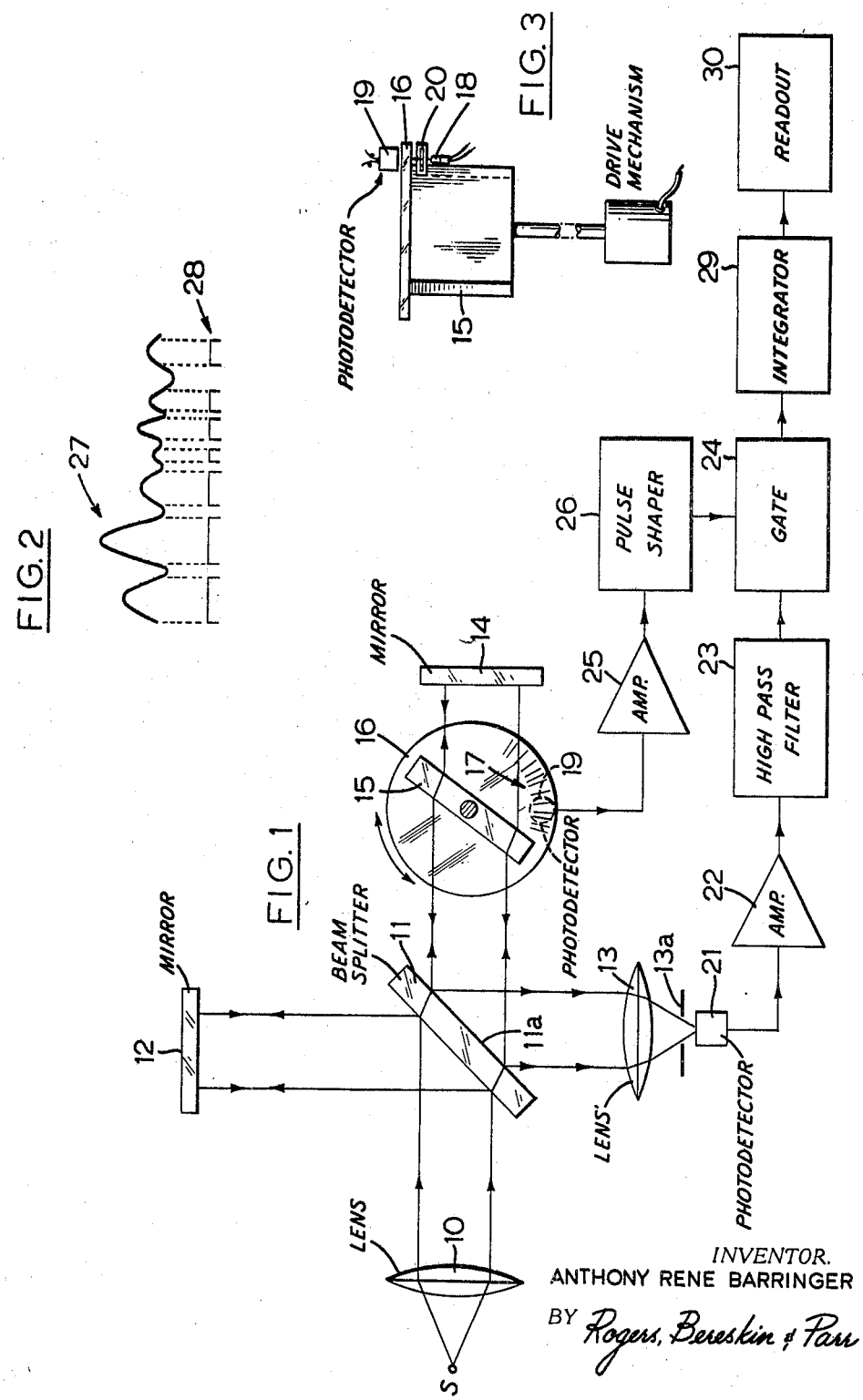

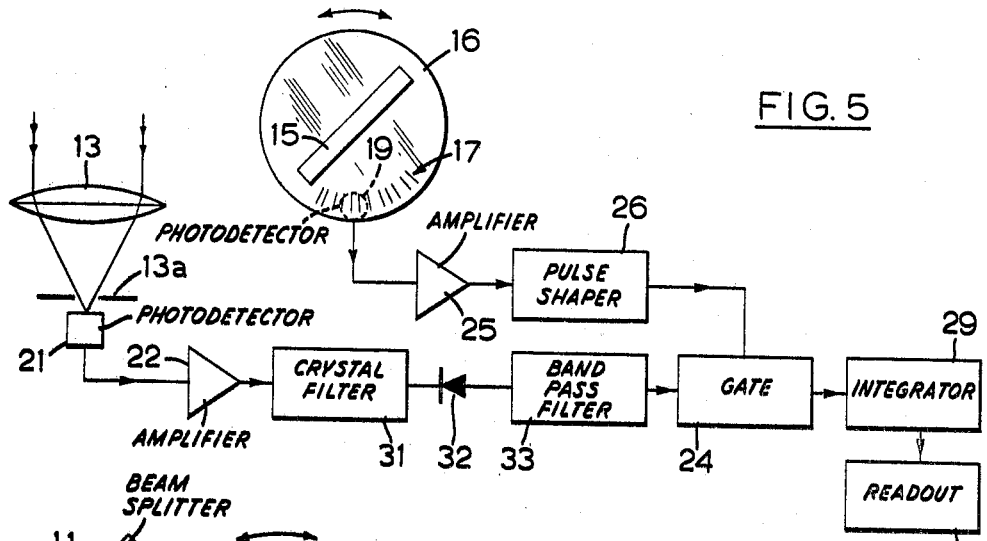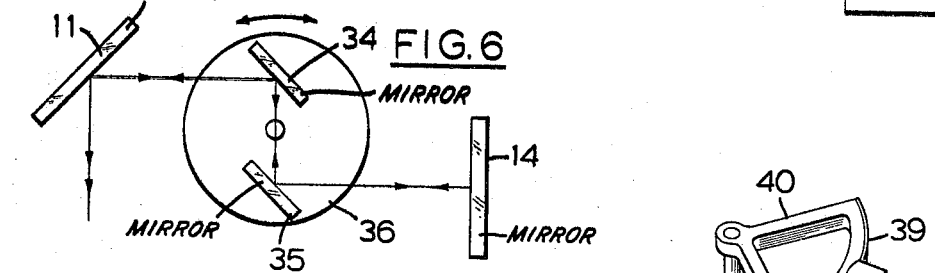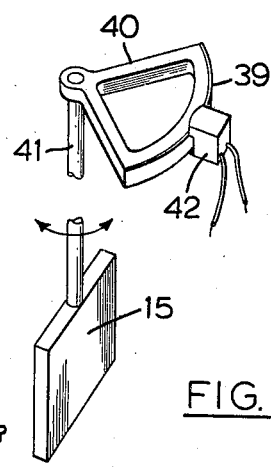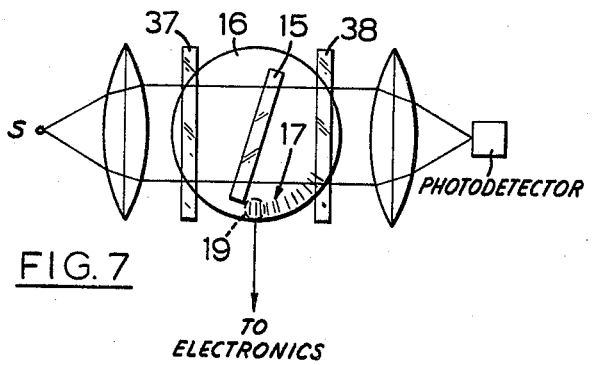

3,482,919
SYNCHRONOUS SPECTRAL SCANNING AND COMPARING INTERFEROMETER
Anthony Rene Barringer, Willowdale, Ontario, Canada, assignor to Barringer Research Limited, Rexdale, Ontario, Canada, a corporation
Filed Nov. 15, 1967, Ser. No. 683,396
Claims priority, application Great Britain, Nov. 22, 1966, 52,134/66
Int. Cl. G01b 9/02
U.S. Cl. 356—106    11 Claims

ABSTRACT OF THE DISCLOSURE

A scanning interferometer wherein light of unknown spectral content is analyzed by comparing time varying signals derived from light emerging from the interferometer with correlation signals which are characteristic of light of particular spectral content. The correlation signals can be derived from a pattern of opaque lines carried by a disc secured to a rotatable optical element, such as the compensation plate of a Michelson interferometer. The optical element is angularly oscillated, thereby varying the path length difference of the interfering beams in the interferometer in a predetermined manner, and the correlation signals which are contemporaneously produced are automatically precisely synchronized with the signals derived from the emergent light.

---

This invention relates to the art of spectroscopy and interferometry and in particular to an improved scanning interferometer for analyzing light of unknown spectral content.

An interferometer is an instrument which is used to observe interference between two or more beams of light, and in particular to measure the wavelength of light and to measure distances and thicknesses in terms of the wavelength of light. Although the present invention is applicable to a number of known interferometers, it is convenient to use a modified Michelson interferometer for producing interferences. In the Michelson interferometer, a half-silvered plane-parallel optical flat called a beam splitter is used to divide the light into two beams which are re-combined to produce interferences. Two optically plane mutually perpendicular mirrors are used for respectively reflecting each beam. As the path length of one of the beams is changed (e.g. by moving one of the mirrors), the intensity of the light emerging from the interferometer is modulated in a manner that is characteristic of the spectrum of the light entering the interferometer.

Scanning interferometers have been devised in which the path length difference of the two beams is cyclically varied by attaching one of the mirrors to the voice coil of a loud-speaker, which is driven by an alternating current generator of variable frequency and amplitude. The spectrum of the light entering the interferometer is determined by converting the light emerging from the interferometer into an electrical signal, which is recorded and fed into a frequency analyzer or a computer programmed to perform a Fourier analysis of the recorded signal. An example of prior apparatus of this kind is disclosed in U.S. Patent No. 3,286,582 dated Nov. 23, 1960 of Block Engineering, Inc. Although the above arrangement of varying the path length difference is convenient, stability is a problem as the voice coil does not provide a very steady support. The present invention provides very stable variation of the path length difference while at the same time eliminating the need for a frequency analyzer or computer to perform Fourier analysis.

According to one aspect, the invention consists of a rotatable optical element (such as the compensation plate commonly used with Michelson interferometers) which is positioned so as to cause changes in path length difference of interfering portions of light in the interferometer as the optical element is rotated, means for angularly oscillating the optical element so that the path length difference is cyclically varied in a predetermined manner, spectrum characterizing means consisting, for example, of a mask having a pattern of opaque lines with transparent spaces between them and means for deriving correlation signals from the mask, the correlation signals being precisely synchronized with the rotation of the optical element (as, for example, by fixing the mask to the optical element), means for detecting light emerging from the interferometer including means for producing time varying electrical signals proportional in amplitude to the intensity of the light emerging from the interferometer, means for correlating the electrical signals with the correlation signals, and means for indicating the existence of correlation between the electrical signals and the correlation signals.

The above and other embodiments of the invention are illustrated in the accomapiying drawings, wherein the same reference numerals are used for the same parts in the several views, and wherein:

FIG. 1 is a diagrammatic view showing the principal optical and electronic components of one embodiment of the invention, FIG. 2 is a graphical view showing correlative electronic signals, FIG. 3 is a side view of an arrangement used for producing correlation signals, FIG. 4 is a graphical view showing a typical interferogram, FIG. 5 is a diagrammatic view showing a portion of the principal optical and electronic components of another embodiment of the invention, FIG. 6 is a diagrammatic view showing an alternative arrangement for varying the path length difference, this arrangement particularly being suitable for infrared light, FIG. 7 is a diagrammatic view showing the invention applied to another form of interferometer, in this case a Fabry-Perot interferometer, and FIG. 8 is a perspective view of a form of characterizing means using a strip of magnetic tape.

Referring to FIG. 1, light from a source S is rendered parallel by a lens 10 and is directed towards a plane-parallel optical flat or plate 11, which preferably has a half-silvered reflecting surface 11a. The light is divided by the plate 11 into two beams of approximately equal amplitudes. One beam is refraced through the plate 11, reflected from the reflecting surface 11a, and then directed to an optically plane mirror 12. This beam then reflects from the mirror 12 back along its original path to the plate 11 where it is refracted towards a lens 13. The other beam is refracted through the plate 11 towards an optically plane mirror 14 which reflects the beam back towards the reflecting surface 11a of the plate 11, from which it is reflected towards the lens 13. Thus, from a single source there are produced two beams travelling towards the lens 13 and suitable for the production of interference or fringes. The images of the mirrors 12 and 14 must be parallel to each other. It is desirable to provide means for adjusting the angular orientation of one mirror relative to the other.

A plane-parallel optical flat 15 (identical to the optical flat 11 except that it is not silvered), hereinafter called the compensation plate, is inserted between the plate 11 and the mirror 14 in order to equalize the optical paths of the interfering beams. Ordinarily, in a conventional Michelson interferometer the compensation plate 15 is parallel to the plate 11. However, in the present invention the compensation plate 15 (or its equivalent) is rotated or angularly oscillated in order to vary the path length difference of the two interfering beams. Rotation of the plate 15 introduces some astigmatism, but this has not proved to be particularly important. From the geometry of the arrangement shown in FIG. 1 it is apparent that the direction of the beam reflected from the mirror 14 remains the same during rotation of the compensation plate 15 but the path length of the beam within the compensation plate 15 varies in accordance with the angular position of the compensation plate 15. The thickness of the compensation plate 15 determines the path length difference that is swept as the compensation plate 15 is rotated. A circular transparent disc 16 (constituting a mask used for corelation) is removably secured to the compensation plate 15, and it is located outside of the path of the beam travelling between the plate 11 and the mirror 14. A plurality of correlation lines 17 is provided around the periphery of the disc 16. Correlation signals are derived from the correlation lines 17 by the arrangement shown in FIG. 3 wherein the light from a small lamp 18 shines through the disc 16 and falls upon a photodetector 19. The photodetector 19 is a photosensitive transducer such as a light sensitive field effect transistor, photoresistor, photovoltaic cell, photodiode or the like. As the disc 16 is rotated, the correlation lines 17 causes the light shining upon the photodetector 19 to be modulated. Accordingly, the output of the photodetector 19 consists of a series of electrical pulses the nature of which depends upon the spacing and density of the correlation lines 17. In order to improve correlation, a fine slit 20 preferably is interposed between the lamp 18 and the disc 16.

In practice it is more efficient to angularly oscillate the compensation plate 15 (e.g. by means of a cam) than to continuously rotate it. The reason for this is that in most cases the desired total path length difference can be achieved with a comparatively small angular displacement of the compensation plate 15. A practical limit to the angular displacement is about 45°. At larger angles imperfections in the quality of the optical flat become more pronounced. In a prototype of the present embodiment, the compensation plate 15 was 0.2" thick. This thickness limits the angular displacement, because for even small angular displacements a wide path length difference is swept. In order to increase the angular displacement, a thinner compensation plate can be used, and the remainder of the necessary compensation can be provided by an additional fixed compensation plate parallel to the plate 11. It will be noted that the angle of the segment of the disc 16 containing the correlation lines 17 is limited by the angle through which the compensation plate 15 is rotated. However, it will be understood that several tracks or bands of similar sets of correlation lines 17 can be disposed on the disc 16, with separate lamps 18, photodetectors 19 and associated pulse forming circuits for each set of correlation lines 17.

It is preferable in this embodiment to design the mechanism for oscillating the compensation plate 15 so that the path length difference increases linearly with time. The frequency of rotation of the compenation plate 15 is comparatively low, e.g. of the order of 1 cycle per minute (especially for infrared) to 10 c.p.s.

Light emerging from the interferometer is focussed by the lens 13 towards a photodetector 21 which is a photosensitive device of the kind described above (e.g. a light sensitive field effect transistor, etc.). It is desirable to expose the photodetector 21 to only a single fringe, e.g. the central fringe. This can be done by providing an exit stop 13a to permit only the central fringes to pass through, or else to use a tiny photodetector which receives light from only one fringe, e.g. the central fringe. The output of the photodetector 21 consists of a D.C. voltage proportional to the total intensity of the light emerging from the interferometer, and an A.C. component. The output of the photodetector 21 is amplified by an amplifier 22. Any D.C. or slowly fluctuating A.C. component is blocked by a high pass filter 23 having a cut-off frequency of, for example, five c.p.s. or less. The output of the high pass filter 23, which consists of an A.C. voltage containing interference information, is fed to a gate 24. The gate 24 is opened at periodic intervals in accordance with the correlation signals derived from the correlation lines 17 on the disc 16, as follows. The output of the photodetector 19, which includes an A.C. voltage caused by the modulation of the light from the lamp 18 as the correlation lines 17 rotate relative to the lamp, is amplified by an amplifier 25 and then is fed to a pulse shaper 26 which provides clean gating pulses for controlling the gate 24.

Referring to the waveforms shown in FIG. 2, a typical A.C. voltage from the high pass filter 23 is indicated generally by reference numeral 27, and corresponding gating pulses from the pulse shaper 26 are indicated generally by reference numeral 28. The A.C. voltage 27 shown in FIG. 1 represents the general case wherein the light entering the interferometer contains a mixture of frequencies. It will be noted that the gating pulses 28 coincide with each positive-going portion of the A.C. voltage 27. Accordingly, when the positive-going portions of the A.C. voltage 27 coincide with the gating pulses 28, correlation is achieved. The output of the gate 24 is fed to an integrator 29, the output of which is indicated by any suitable readout means 30 such as a meter, recorder or the like. When the A.C. voltage 27 correlates exactly with the gating pulses 28, the output of the gate 24 is coherent and the integrator 29 will produce a D.C. output voltage which is indicaed by the readout means 30. However, if the A.C. voltage 27 does not correlate with the gating pulses 28, the output of the gate 24 is integrated out by the integrator 29, and the output of the integrator 29 then is zero. The various electronic circuits referred to above are all conventional. If desired, correlation can be made with negative-going portions of the A.C. voltage 27 by providing an additional gate which is adapted to open during intervals between the gating pulses 28. The outputs of each gate then would be fed to the respective inputs of a differential amplifier. Electronic correlators per se are well known.

The operation of the interferometer will first be described with reference to a monochromatic source S. If the wavelength of the source S is 5,000 A., for example, and the thickness and angular rotation of the compensation plate 15 is such that the path length difference of the two beams is varied by 1,000 wavelengths during every cycle of motion of the compensation plate 15, then 1,000 interferences or beats will be observed in the intensity of the light emerging from the lens 13. The beats will be evenly spaced and of equal periods assuming the path length difference of the two beams is varied linearly with time. The correlation lines 17 on the disc 16 correspond to maxima in the emergent light. In the example referred to the correlation lines 17 would consist of 1,000 lines suitably spaced to correlate exactly with the 1,000 beats of the emergent light. In practice the correlation lines 17 can be prepared photographically by depositing a photographic emulsion on the disc 16 and exposing it to light pulses through the slit 20, as the compensation plate 15 is being rotated. The light pulses are produced by the lamp 18 which is connected to the output of the high pass filter 23. Thus a series of lines are formed on the periphery of the disc 16 corresponding to the maxima in the output of the photodetector 21. It is preferable to amplify the output of the photodetector 21 as much as possible in preparing the correlation lines 17 and then to feed the amplified signal through a limiting circuit so that the voltage applied to the lamp 18 consists of square wave pulses.

It will be understood that for each monochromatic wavelength there is a unique spacing of correlation lines 17, and by using different discs 16 each programmed for a particular wavelength, the interferometer can be used to identify the presence of any particular wavelength present in the light entering the interferometer. The selectivity of the interferometer depends upon the number of wavelengths through which the path length difference is varied and the number of gate samples which are integrated in the integrator 29. Thus, if the path length difference is varied by 1,000 wavelengths, 1,000 gate pulses corresponding to 1,000 correlation lines 17 are produced and 1,000 gate samples are integrated. The effective bandwidth in this case is about one part in 1,000 or 0.1%. Bandwidths of one part in 10,000 appear achievable by using sufficiently thick compensation plates and high resolution emulsions on the disc 16.

The example given above refered to a monochromatic source. It will be understood, however, that the interferometer can also be used for analyzing complex spectra, e.g. emission or absorption spectra in gases and vapours. A typical spectrum of light emerging from the interferometer, corresponding to a complex spectrum of incident light, is shown in FIG. 4. It will be noted that there are large amplitude intensity variations (hereinafter called fringes) in the central portion of the illustrated spectrum. These occur when the path length difference is close to zero. The frequencies from all wavelengths are in phase when the path length difference is zero, but phase coherence is lost as the path length difference is increased. The fringes in the vincinity of zero path length difference are known as zero order interference fringes. In view of the fact that the phase of the fringes at zero path length difference is constant, independent of frequency, the fringes in the vicinity of zero path length difference cannot be used for correlation purposes. It will be noted that a series of maxima and minima appear on each side of the zero order interference fringes shown in FIG. 2, and either of these portions of the spectrum can be used for determining the frequency content of the incident light.

For every characteristic spectrum of light entering the interferometer there is a characteristic interferogram obtained at the output of the interferometer. As indicated above for monochromatic light a series of uniform beats is obtained if the path length difference is varied linearly with time. For a complex spectra a complex waveform is obtained which carries all of the information relating to the frequency content of the incident light. The interferometer can be calibrated for the characteristic absorption spectrum of a gas, for example, by placing a cell containing the gas in front of the entrance aperture of the interferometer, with a suitable broad band light source projected through the gas into the interferometer. The photographic emulsion on the disc 16 is then exposed in the manner indicated above, and the resulting correlation lines 17 on the disc 16 are then characteristic of the particular gas contained within the cell. When the same disc is used for analyzing gas or vapour of unknown composition, the degree of cross-correlation, indicated by the level of the output of the integrator 29, is a function of the amount of the particular gas present in the unknown sample. By suitably calibrating the interferometer with known gases and vapours of various densities it is possible to measure the density of the particular gas present in an unknown sample. Thus, the present interferometer can be used in performing absorption measurements over long path lengths in air, for air pollution studies for example. In this case, however, it is necessary to compensate for varying levels of ambient light intensity, but this can be done by applying conventional automatic gain control to the photodetector 21 and amplifier 22 in order to maintain the average D.C. output of the photodetector 21 at a constant predetermined level. The result of applying automatic gain control is that the output of the integrator becomes normalized to an effectively standard light level and therefore becomes a quantitative indication of the degree of atmospheric absorption of the particular spectrum being analyzed.

Referring now to FIG. 5, an alternative embodiment is shown which employs a narrow band crystal filter 31 connected to the output of the amplifier 22. The optical portion of the interferometer is identical to that of FIG. 1, and has been omitted from FIG. 5 as it is only necessary to show the disc 16 in order to explain the operation of this embodiment. In addition, most of the electronic portion is identical to that of FIG. 1, although the function of this embodiment is considerably different from that of FIG. 1 due to the presence of the crystal filter 31. The output of the crystal filter 31 is rectified by a suitable diode 32, and a band pass filter 33 is provided between the diode 32 and the gate 24. For the sake of simplicity, the operation of this embodiment will first be described with reference to incident light of a monochromatic wavelength, and it will be assumed that the compensation plate 15 is angularly oscillated at a constant angular velocity. As in the case of the embodiment of FIG. 1, the compensation plate 15 is moved cyclically between two limits. At one limit, the path length difference is a minimum, and is such that the large amplitude zero order fringes shown in FIG. 4 are not produced. At the other limit the path length difference is a maximum, and its value depends upon the thickness of the compensation plate 15. When the compensation plate 15 is rotated at a constant angular velocity between these two limits, the path length difference, instead of varying linearly with time as in the case of the embodiment of FIG. 1, varies sinusoidally. Assuming that the light entering the interferometer is monochromatic, the frequency of the beats of emergent light also will vary sinusoidally instead of being of a constant frequency as before. In other words, the frequency of the beats will vary from a lower limit to an upper limit during rotation of the compensation plate 15, and it can be shown that this continuous variation of frequency is repeated four times during every cycle of rotation of the compensation plate 15. The center frequency of the crystal filter 31 is made equal to a frequency approximately in the middle of the range between the upper and lower frequency limits referred to above, and its bandwidth is as narrow as possible. Thus, for each cycle of rotation of the compensation plate 15, there will be four occasions when the frequency of the A.C. voltage appearing at the output of the photodetector 21 will correspond to the center frequency of the crystal filter 31. On these four occasions a signal will pass through the crystal filter 31 and then will be rectified by the rectifier 32. The rectified signal is then passed through the band pass filter 33 to provide an impulse signal. The band pass filter passes the envelope of the signals emerging from the crystal filter 31, and not the comparatively high frequencies contained within the envelope. For each monochromatic wavelength, there will be four unique angular positions of the compensation plate 15 that result in signals passing through the crystal filter 31. The correlation lines 17 on the disc 16 can be prepared in the same manner described above with reference to FIG. 1, and the operation of the remainder of the circuit is exactly the same as that of the embodiment of FIG. 1. As the compensation plate 15 is rotated, a series of pulses emerge from the band pass filter 33 and are correlated by the gate 24 with the correlation lines 17 on the disc 16. The integrator 29 provides a D.C. output only when correlation exists. An advantage of this embodiment is that the number of correlation lines 17 for any given spectrum is considerably reduced as compared with the first embodiment. In effect, a Fourier analysis is carried out by the crystal filter 31, and instead of correlating with a large number of correlation lines 17 representing individual peaks or maxima on the interferogram, correlation is achieved with the considerably smaller number of peaks represented by the Fourier analog of the interferogram. The result is that there is less crowding of information on the disc 16, and the interferometer is relatively immune to small, long term differential changes in path length associated with temperature variations and expansion of the various components in the interferometer. These advantages are offset, however, by a requirement that the angular rotation of the compensation plate 15 must be maintained at a precisely controlled rate. The resolution of this embodiment of the invention is a function of the bandwidth of the crystal filter 31 and of the degree to which the motion of the compensation plate 15 may be maintained constant.

In the description of the operation of the embodiment of FIG. 5, reference was made to rotating the compensation plate 15 at a constant angular speed. As indicated above, the frequency of the beats of light emerging from the interferometer will then vary sinusoidally. In order to provide a Fourier analysis with a linear time base, the compensation plate 15 should be driven in such a manner that there is constant acceleration of the path length difference. If this condition is satisfied, the frequency of the light beats emerging from the interferometer will increase linearly with time during the rotation of the compensation plate 15. The compensation plate 15 can be programmed to follow any desired law of motion by means of a cam of predetermined shape, together with a suitable mechanical drive system. Motion of the compensation plate 15 then is governed by a law determined by the shape of the cam. A possible disadvantage of this arrangement is that the mechanical drive must be extremely accurate. In order to avoid problems with mechanical drive, it is suggested that the path length difference be varied linearly with time (i.e. at constant speed) and that the frequency of the speed of variation of the path length difference be slowly increased with time, during a plurality of successive sweeps. This can be accomplished by means of a synchronous motor, by gradually increasing the frequency of the voltage energizing the motor.

The speed of rotation of the compensation plate 15 shoud be designed to match other parameters of the interferometer. For example, the frequency of beats of emergent light cannot be higher than the speed of response of the photodetector 21. Similarly, the rate of change of the frequency of the signals appearing at the input of the crystal filter 31 must not be too high for the rise time of the crystal filter 31. In addition, it is desirable to restrict the bandwidth of the incident light to that which is adequate to cover the spectrum of interest, as an unnecessarily broad bandwidth of incident light places excessive demands on the dynamic range of the photodetector 21. Interference filters or other monochromators can be used to restrict the bandwith. It will be understood that the maximum wavelength band that can be analyzed by the interferometer depends upon the thickness of the compensation plate 15.

Although principles of the invention are equally applicable to the infrared region of the spectrum as to the visible and ultraviolet, in practice it becomes difficult to construct a suitably transparent compensation plate 15 at infrared wavelengths. Accordingly, for the infrared region this arrangement shown in FIG. 6 can be used, wherein a pair of mirrors 34 and 35 replace the compensation plate 15. Referring to FIG. 6, light from the plate 11 (beam splitter) is directed towards a mirror 34 that is parallel to an optically plane mirror 35. The light beam from the plate 11 is reflected from the mirror 34 towards the mirror 35, from which it is reflected to the mirror 14. The mirrors 34 and 35 are secured to a platform 36 that is angularly rotated in the same manner in which the compensation plate 15 is rotated. The beam is then reflected from the mirror 14 back towards the plate 11 along the same path. It will be noted from the geometry of the arrangement shown in FIG. 6 that angular oscillation of the mirrors 34 and 35 relative to the direction of the beam from the plate 11 will cause the path length of the beam to be varied in a cyclical manner, as before.

Thus, by means of the arrangement of FIG. 6 the path length of the beam can be varied without requiring refraction, and hence substantial changes in path length can be achieved even in the infrared region of the spectrum.

Although the invention has been described with reference to a Michelson interferometer, it will be understood that principles of the invention are applicable to other forms of interferometers as well, such as the Jamin, Mach-Zehnder, and Fabry-Perot interferometers. FIG. 7 shows the Fabry-Perot configuration with a compensation plate 15 and a disc 16 positioned between two plane-parallel optical flats 37 and 38. As in the case of the Michelson arrangement described above, the compensation plate 15 is rotated or angularly oscillated in order to vary the path length of the multiply transmitted beams arising from internal multiple reflections within the optical flats 37 and 38.

Instead of using photographic emulsion or film for recording the correlation lines 17, it will be understood that a magnetic drum or a strip of magnetic tape secured to any suitable rotatable support can be substituted for the disc 16 with its correlation lines 17. The correlation "lines" would then be recorded magnetically instead of photographically. A disadvantage of this arrangement, however, is that considerably less information can be recorded in the same space as can be recorded photographically. However, a magnetic drum or tape may be convenient for rapid and simple programming and it is possible to change the recorded pattern very easily. The arrangement shown in FIG. 8 is convenient when a magnetic tape is used. A strip of magnetic tape 39 is attached to a non-magnetic sector shaped member 40. A shaft 41 connects the compensation plate 15 to the member 40 so that the latter is angularly oscillated together with the compensation plate 15. A conventional record/playback head 42 replaces the photodetector 19 shown in FIGS. 1 and 5, and its function is to record and play back information on the magnetic strip 39.

In a still further arrangement, the correlation lines 17 can be embodied in a mask that is carried by a holder fixed to the frame of the interferometer, instead of being fixed to the disc 16 as shown in FIG. 1. The correlation signals could then be derived by reflecting a narrow beam of light off a small mirror fixed to the compensating plate 15 towards the mask, so that as the compensating plate 15 rotates the beam of light is caused to scan the correlation lines 17. An advantage of this arrangement is that the inertial load on the compensating plate 15 is reduced, due to the elimination of the disc 16.

What I claim as my invention is:

1. In a scanning interferometer for analyzing light of unknown spectral composition, the improvement comprising, in combination:

(a) a rotatable optical element,
   (b) means for supporting the optical element in a position so that rotation of the optical element causes changes in the path length difference of interfering portions of light in the interferometer,
   (c) means for angularly oscillating the optical element so that said path length difference is cyclically varied in a predetermined manner,
   (d) spectrum charactirizing means for producing time varying correlation signals which are precisely synchronized with the rotation of the optical element, said correltaion signals being characteristic of light of predetermined spectral content,
   (e) means for detecting light emerging from the interferometer including means for producing time varying electrical signals proportional in amplitude to the intensity of the light emerging from the interferometer,
   (f) means for correlating said electrical signals with said correlation signals, and
   (g) means for indicating the existence of correlation between said electrical signals and said correlation signals.

2. The invention claimed in claim 1 wherein said optical element is a plane parallel transparent optical flat, and wherein said spectrum characterizing means includes a transparent device having a pattern of opaque lines with transparent spaces between the lines, said pattern being characteristic of light of predetermined spectral content, and means for deriving said correlation signals from said pattern of lines as said optical flat is angularly oscillated.

3. The invention claimed in claim 2 wherein said transparent device is fixed to said optical flat and wherein said spectrum characterizing means further includes a lamp positioned on one side of said device and a photodetector positioned on the other side of said device so that the light shining upon the device from the lamp is modulated as said optical flat is angularly oscillated.

4. The invention claimed in claim 2 wherein said correlating means includes an electronic gate which is controlled by said correlation signals.

5. The invention claimed in claim 4 wherein said indicating means includes an integrator for integrating the output of said gate and means for indicating the output of said integrator.

6. The invention claimed in claim 1 wherein said interferometer includes means for splitting light entering the interferometer into two beams, and means for recombining the beams to produce interference, and wherein said optical element is a pair of spaced-apart, plane parallel mirrors secured to a rotatable platform, said mirrors being positioned on said platform with one of said mirrors in the path of one of said beams so that said one beam is reflected by said one mirror towards the other mirror and is reflected by said other mirror along a path that is parallel to the path of said one beam.

7. The invention claimed in claim 1 wherein said optical element is a plane parallel transparent optical flat, and wherein said spectrum characterizing means includes a strip of magnetic tape having correlation signals recorded thereon, said strip being secured to a support which is fixed to said optical element, and a magnetic playback head positioned next to said strip for receiving the correlation signals as said optical element is angularly oscillated.

8. The invention claimed in claim 2 wherein said interometer is a Fabry-Perot interferometer having a pair of spaced-apart plane parallel optical plates, and wherein said optical element is positioned between said optical plates.

9. The invention claimed in claim 2 wherein said interferometer includes means for splitting light entering the interferometer into two beams, and means for recombining the beams to produce interference in the light, said optical element being positioned in one of the beams and being rotated so that the path length difference of said two beams increases linearly with time.

10. The invention as claimed in claim 2 wherein said optical element is angularly oscillated at constant angular velocity so that the frequency of light beats emerging from the interferometer varies sinusoidally between an upper limit and a lower limit, and wherein said detecting means includes a narrow band crystal filter tuned to a frequency approximately mid-way between said upper and lower limits.

11. The invention as claimed in claim 2 wherein said optical element is angularly oscillated so as to provide constant acceleration of the path length difference whereby the frequency of light beats emerging from the interferometer varies linearly with time between an upper limit and a lower limit, and wherein said detecting means includes a narrow band crystal filter tuned to a frequency approximately mid-way between said upper and lower limits.

References Cited

UNITED STATES PATENTS 3,012,467  12/1961  Rosenthal.

JEWELL H. PEDERSEN, Primary Examiner

T. MAJOR, Assistant Examiner